US012165096B2

(12) United States Patent
Russo (10) Patent No.: US 12,165,096 B2
(45) Date of Patent: Dec. 10, 2024

(54) APPARATUS AND METHOD FOR DETERMINING CARBON EMISSIONS OF A SHIPMENT (71) Applicant: PITT-OHIO, Pittsburgh, PA (US)

(72) Inventor: Justine A. Russo, Pittsburgh, PA (US)

(73) Assignee: PITT-OHIO, Pittsburgh, PA (US)

( * ) Notice: Subject to any disclaimer, the term of this patent is extended or adjusted under 35 U.S.C. 154(b) by 28 days.

(21) Appl. No.: 17/981,002

(22) Filed: Nov. 4, 2022

(65) Prior Publication Data
US 2024/0152852 A1 May 9, 2024

(51) Int. Cl.
G06Q 10/083 (2024.01)

(52) U.S. Cl.
CPC .................. G06Q 10/083 (2013.01)

(58) Field of Classification Search
CPC ....... G06Q 10/083; G06Q 50/40; G06Q 50/60
See application file for complete search history.

(56) References Cited

U.S. PATENT DOCUMENTS

| | | | |
|---|---|---|---|
| 8,175,930 B2 | 5/2012 | Ourega | |
| 8,265,986 B2 | 9/2012 | Cheng | |
| 8,498,818 B1 * | 7/2013 | Jones, Jr. | G06Q 10/083 702/182 |
| 9,430,777 B1 * | 8/2016 | Strand | G06Q 10/08345 |
| 10,163,119 B1 | 12/2018 | Bolton | |
| 10,896,401 B2 | 1/2021 | Berdinis | |
| 2014/0039787 A1 * | 2/2014 | Bourne | G01C 21/20 701/400 |
| 2020/0374605 A1 * | 11/2020 | Snook, II | G06Q 50/06 |
| 2022/0067751 A1 * | 3/2022 | Sanchez | G06Q 10/08345 |
| 2022/0207552 A1 * | 6/2022 | Normand | G06Q 30/0631 |
| 2022/0358515 A1 * | 11/2022 | Kahn | G06F 30/27 |
| 2023/0153743 A1 * | 5/2023 | Kaneria | G06Q 10/083 705/332 |

OTHER PUBLICATIONS

De Morais Miguel, Diogo Filipe Macedo, Environmental assessment of parcel delivery: from data sources to data analysis, Universidade do Porto, Oct. 13, 2022.*

* cited by examiner

Primary Examiner — Nathan Erb
(74) Attorney, Agent, or Firm — Caldwell Intellectual Property Law (57) ABSTRACT An apparatus and methods for determining carbon emissions of a requested shipment are provided. A computing device of apparatus may be configured to receive a customer request for a shipment of a moveable good. In one or more embodiments, computing device may be configured to provide shipment elements of the shipment as a function of customer request. In one or more embodiments, carbon emission data describing carbon emissions of shipment may be determined by computing device as a function of carbon emission data and/or shipment elements.

18 Claims, 5 Drawing Sheets

APPARATUS AND METHOD FOR DETERMINING CARBON EMISSIONS OF A SHIPMENT

FIELD OF THE INVENTION

The present invention generally relates to the field of transportation and carbon efficiency. In particular, the present invention is directed to methods and apparatus for determining carbon rates of a shipment.

BACKGROUND

Modern providers have many transports that need to be tracked and the providers need to allocate resources for the transports accordingly. Current systems for tracking transports are not time efficient and are prone to human error.

SUMMARY OF THE DISCLOSURE

In an aspect, an apparatus for determining carbon emissions of a shipment is disclosed. I The apparatus includes at least a processor and a memory communicatively connected to the at least a processor. The memory includes instructions configuring the at least a processor to receive a customer request from a customer for a shipment, provide a shipment element as a function of the customer request, determine a carbon emission as a function of the shipment element, and generate a proposed shipment schedule as a function of carbon emission.

In an aspect, a method for determining carbon emissions of a shipment is disclosed. The method includes receiving, by a processor, a customer request from a customer for a shipment, providing, by the processor, a shipment element as a function of the customer request, determining, by the processor, a carbon emission as a function of the shipment element, and generating, by the processor, a proposed shipment schedule as a function of carbon emission.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Described in this disclosure is a system for determining carbon emissions and/or carbon emission rates of a shipment. Apparatus and methods described in this disclosure may be used to calculate carbon emissions associated with the transportation of moveable goods. For example, and without limitation, carbon emission related to shipment having a truck move a specific quantity of a good from a first destination to a second destination may be determined by computing device. In some embodiments, a customer may select alternative routes, means of transportation, dates, and the like to alter the determined carbon emission of a shipment by a desirable amount. In some embodiments, apparatus may include a computing device. Computing device may be configured to receive a customer request for a shipment of a moveable good. In one or more embodiments, computing device may be configured to receive customer request using a server. In some embodiments, the server may be configured to communicate between a provider computing device and a customer computing device. Customer request may include cargo data, destination data, temporal data, and the like of a shipment. In one or more embodiments, computing device may be configured to provide shipment elements of the shipment as a function of customer request. In various embodiments, shipment elements may include rate data, vehicle data, geographic data, fuel usage data, emission factor data, mileage data, and the like. In one or more embodiments, carbon emission data describing carbon emissions of shipment may be determined by computing device as a function of carbon emission data and/or shipment elements.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
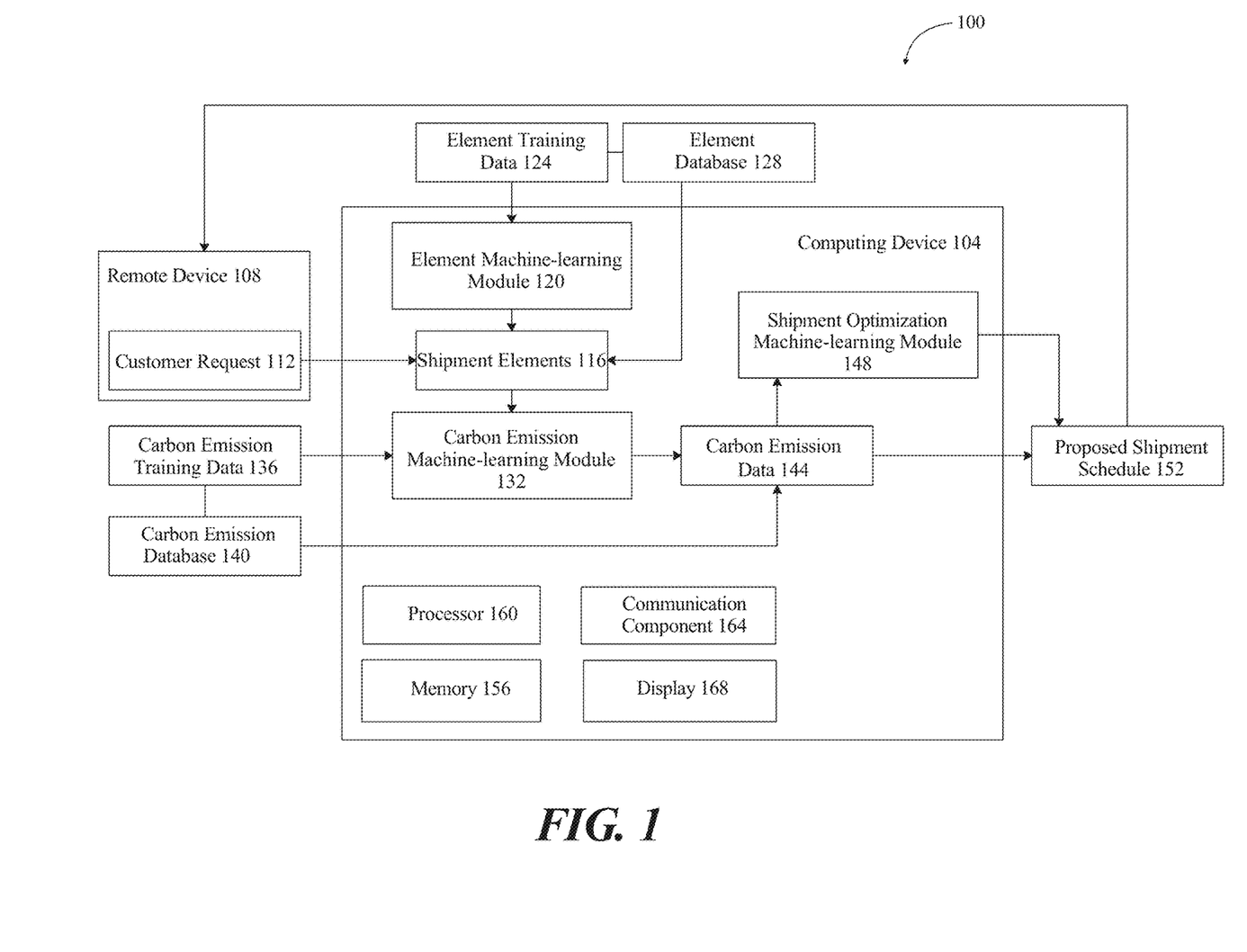
FIG. 1 is a block diagram of an apparatus for determining carbon emission of a shipment in accordance with one or more embodiments of the present disclosure.

Referring now to FIG. 1, an exemplary embodiment of an apparatus 100 determining carbon emissions of a shipment is illustrated. In one or more embodiments, apparatus 100 includes a computing device 104. Computing device 104 may include any computing device as described in this disclosure, including, and without limitation, a microcontroller, microprocessor, processor, computing system, digital signal processor (DSP), control chip, and/or system on a chip (SoC) as described in this disclosure. Computing device 104 may include, be included in, and/or communicate with a mobile and/or remote device such as a mobile telephone, smartphone, tablet, laptop, and the like. Computing device 104 may include a single computing device operating independently, or may include two or more computing devices operating in concert, in parallel, sequentially, or the like. Two or more computing devices may be included together in a single computing device or in two or more computing devices. Computing device 104 may interface or communicate with one or more additional devices as described below in further detail via a network interface device. For example, and without limitation, computing device 104 may be communicatively connected to one or more remote devices. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104, and/or components thereof, may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In one or more embodiments, computing device 104 may include components such as a processor 160, a memory 156, a communication component 164, a display 168, or other components, such as for example and without limitation, sensors. In one or more embodiments, each component may be communicatively connected to one or more of the other components of computing device 104 and/or a remote device, such as remote device 108 (e.g., remote user device). For example, and without limitation, memory 156 may be communicatively connected to processor 160. In one or more embodiments, memory 156 of computing device 104 contains instructions configuring processor 160 to execute any of the steps, processes, and/or methods described in this disclosure. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 156 contains instructions configuring processor 160 to receive a customer request 112. In one or more embodiments, customer request may be transmitted by a remote device 108. For the purposes of this disclosure, a "remote device" is a device located remote to apparatus. Remote device 108 may include a user device, such as, for example, a customer device. Remote device 108 may include a smartphone, mobile phone, laptop computer, desktop computer, tablet, any of computing device and/or system described in this disclosure, and the like.

In one or more embodiments, customer request 112 may include an electronic communication from a customer, where a customer includes any person or company that purchases transportation of a good. For example, and without limitation, a customer may include a manufacturer requesting that a good, such as and without limitation, wood, may be moved from a first location, a wood provider, to a second location, and building owned by the manufacturer which is where the wood will be processed. For the purposes of this disclosure, a "customer request" is a communication requesting transportation of a good. For example, and without limitation, a customer request may include a communication from a vendor detailing that there is a shipment ready for delivery and that the vendor needs to schedule a delivery time at a supplier facility. In various embodiments, customer request 112 may be a text, email, generated form, answered prompt, voice recording, video instruction, and the like. Customer request 112 may include textual, audio, or visual data and/or information. In one or more embodiments, customer request 112 may include shipment information related to a good (e.g., product), a destination, a time, and the like, as discussed further in FIG. 3 of this disclosure. In one or more embodiments, shipment information may include details related to the shipment, such as a quantity of shipments included in the delivery, departure location, destination location, good characteristics (e.g., parts and/or items to be included in each shipment and associated quantity and size of each part included), and the like.

In one or more embodiments, a shipment may include transportation of a good using, for example, a transport vehicle. A "transport vehicle" as used in this disclosure is a machine capable of moving one or more objects between one or more locations. In some embodiments, a transport vehicle may include, but is not limited to, a freight carrier, a truck, a car, a boat, a plane, a motorcycle, and the like. A transport vehicle may be configured to operate through, but is not limited to, air, land, sea, and the like. A transport vehicle may be configured to engage in one or more steps of a transport. In some embodiments, a transport vehicle may engage in pickup, delivery, and/or line haul operations. In some embodiments, a transport vehicle may include, but is not limited to, Less than Truckload ("LTL") and/or Full Truckload ("FTL") freight delivery. In various embodiments, a transport vehicle may be controlled and/or operated by an operator. An "operator," for the purposes of this disclosure, is a person that uses a transport vehicle. The transport vehicle may be used to transport objects from one location to another. Objects may include, as non-limiting examples, cargo, goods, produces, livestock, non-fungible goods, fungible goods, produce, cargo containers, oil, liquids, gasoline, food, meals, people, and the like.

With continued reference to FIG. 1, memory 156 contains instructions configuring processor 160 to provide one or more shipment elements 116 of a shipment as a function of the customer request 112. For the purposes of this disclosure, a "shipment" is the movement of a good from an initial location to a destination (e.g., final location). A shipment may be completed using a transportation vehicle, which may be a mobile structure that carries goods from the initial location to the destination. For example, and without limitation, a mobile structure may include a truck. For the purposes of this disclosure, a "shipment element" is a characteristic and/or information related to the process of transporting cargo, which includes one or more goods, of a customer via vehicle, such as, for example, a transport vehicle. In one or more embodiments, shipment element 116 may include time data (e.g., departure and arrival date of shipment), vehicle data (e.g., make and model of a vehicle), cargo data (e.g., dimensions of cargo, weight of cargo, and the like), rate data (e.g., rate of travel (mph)), geographical data (e.g., surface gradient, surface type, and the like), condition data (e.g., ambient temperatures, weather conditions, and the like), as discussed further in FIG. 3. "Time data," for the purposes of this disclosure, is temporal information relating to the shipment of goods. In one or more embodiments, time data may include temporal information such as a date and time related to a shipment of goods. For example, and without limitation, time data a departure of a transportation vehicle with goods from an initial location, and time data may also include a date and time related to an arrival of a transportation vehicle with goods to a destination. Time data may also include temporal data related to intermediate stops or checkpoints of transportation vehicle during the shipment of goods. For the purposes of this disclosure, "vehicle data" is data related to a transport vehicle. In another example, and without limitation, vehicle data may include vehicle data related to the transportation vehicle (also referred to in this disclosure as a "vehicle") that is moving the desired goods of a customer. Vehicle data may include a make and model of the, current mileage, smog ratings, weight, dimensions, engine type of the transportation vehicle, and the like. For the purposes of this disclosure, "cargo data" is data relating to goods desired to be transported by a transportation vehicle. In one or more embodiments, cargo data may include information related to goods desired by the customer to be transported by a transportation vehicle. Cargo data may include dimensions, weight, quantity, and the like of the goods. For the purposes of this disclosure, "rate data" is data concerning the rate of travel of a transport vehicle. In another example, and without limitation, in one or more embodiments, rate data includes information related to a rate of travel of a transportation vehicle moving goods desired by a customer. For example, and without limitation, rate data may include a 55-miles per hour speed of a transportation vehicle. In one or more embodiments, geographic data may include environmental or terrain information. For example, and without limitation, geographic data may include a gradient of a surface that transportation will travel along, such as a road. Geographic data may also include a road type, such as asphalt, dirt, and the like. In one or more embodiments, condition data may include information related to a surrounding environment traveled during shipment of transportation vehicle. In another example, and without limitation, condition data may include a road condition, such as icy, snow-covered, wet, and the like. In one or more embodiments, In one or embodiments, shipment elements 116 may be provided by a database of computing device 104 or third party application. In various embodiments, shipment elements 116 may be inputted into computing device 104 by a user using, such as, for example, a peripheral input device (e.g., keyboard) or an integrate input component (e.g., touchscreen of computing device). For example, and without limitation, a user may input shipment elements into computing device 104 via graphical user interface or web application using a keyboard. In other embodiments, shipment elements 116 may be provided from historical data, such as data collected by sensors or past recorded data related to similar shipments. For example, and without limitation, one or more sensors communicatively connected to computing device 104 may detect mileage data (e.g., a mileage) of a vehicle and transmit the data to computing device 104 for storage in database. In other embodiments, shipment elements 116 may be retrieve from a remote database, such as, for example, a website, academic database, government database, or the like. In other embodiments, shipments elements 116 may be provided using an element machine-learning module 120, where element machine-learning module 120 generates a element machine-learning model 120 using element training data 124 which may be inputted by a user or provided from an element database 128. Element machine-learning module 120 may be generated using methods described in this disclosure (e.g., FIG. 4). For example, and without limitation, element machine-learning model may be generated using inputs, such as customer request element inputs, correlated to outputs, such as a shipment element outputs. Such training data may be used to determine a correlation between customer requests and shipment elements, and may be used to train element machine-learning model 120.

With continued reference to FIG. 1, memory 156 contains instructions configuring processor 160 to determine carbon emission data 144 as a function of shipment elements 116. For the purposes of this disclosure, "carbon emission data" is data describing carbon emissions of a shipment. In one or more embodiments, carbon emissions may include carbon dioxide ($CO_2$) gas. In some embodiments, carbon emission data 144 may include greenhouse gas data associated with an operator. "Greenhouse gas data", as used in this disclosure, is a metric associated with a pollutant that contributes to the greenhouse effect. A "pollutant", as used in this disclosure, is a substance that degrades environmental quality. In some embodiments, greenhouse gas data may include, but is not limited to, carbon emissions, water vapor, methane, nitrous oxide, ozone, chlorofluorocarbons, hydrofluorocarbons, perfluorocarbons, and the like. Greenhouse gas data may include measurements associated with an amount of greenhouse gas generated. In one or more embodiments, carbon emission data 144 may include an amount and/or quantity of greenhouse gas generated. An amount of greenhouse gas generated may be represented in, but is not limited to, metric tons, pounds, kilograms, cubic meters, and the like. As a non-limiting example, greenhouse gas data may include data showing 4 metric tons of carbon have been generated by an operator. In some embodiments, greenhouse gas data may include data from one or more pollutant sources. A "pollutant source" as used in this disclosure is any originating source of a pollutant. A pollutant source may include, but is not limited to, transport vehicles, power grids, combustion from boilers, furnaces, transport vehicle emissions, emissions from processes performed by or goods manufactured by a transport vehicle, and the like. In some embodiments, carbon emission data 144 may be a component of greenhouse gas data. In some embodiments, carbon emission datum 144 may include a portion of greenhouse gas data pertaining to carbon emissions and/or carbon emission rates. In one or more embodiments, a carbon emission machine-learning module 132 may be configured to determine carbon emission data 144 as a function of shipment elements 116, as discussed further below in this disclosure. For example, and without limitation, carbon rate machine-learning module 132 may be generated using carbon rate training data 136, which may be retrieved from a carbon rate data base 140 or user input.

In one or more embodiments, memory 156 contains instructions configuring processor 160 to generate a proposed shipment schedule 152 as a function of the determined carbon emission data 144. In some embodiments, processor 160 may generate proposed shipment schedule 152 as a function of shipment elements 116 and corresponding carbon emission data 116. In various embodiments, a schedule optimization machine-learning model 148 may be used to generate proposed shipments schedule 152 as a function of carbon emission data 144. In one or more embodiments, schedule optimization model 148 may also be used to generate an updated proposed shipment schedule as a function of alternative shipment elements 116 and carbon emission data 144, as discussed further in FIG. 2. In one or more embodiments, schedule optimization machine-learning model 148 may be similar to machine-learning model discussed in FIG. 4. In one or more embodiments, schedule optimization machine-learning model may be generated by a machine-learning module using training data. For example, and without limitation, schedule optimization training data may include inputs including carbon emission data inputs correlated to including proposed schedule outputs. In some embodiments, the training data may include previous input and outputs that have been received and generated, respectively, by shipment optimization machine-learning model 148.

Figure 2:
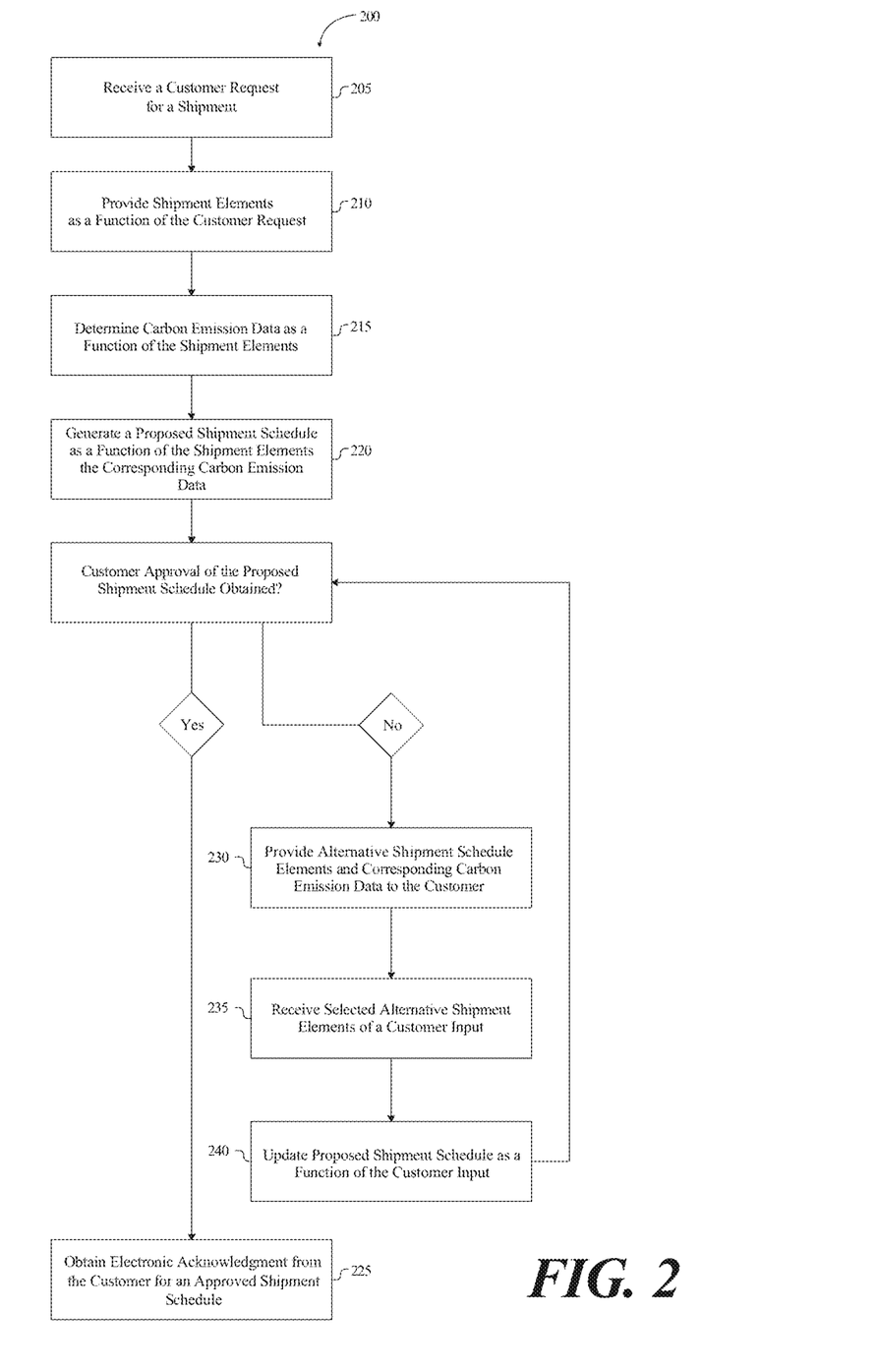
FIG. 2 is a flow chart of an exemplary method for generating an approved shipment schedule of a shipment in accordance with one or more embodiments of the present disclosure.

Now referring to FIG. 2, a flow chart of an exemplary method 200 of generating an approved shipment schedule of a requested shipment is shown. As shown in step 205, method 200 may include receiving, by processor 160, customer request 112 for a shipment.

Still referring to FIG. 2, as shown in step 210, method 200 may include providing, by processor 160, shipment elements 116 of the shipment as a function of the customer request 112.

Still referring to FIG. 2, as shown in step 215, method 200 may include determining carbon emission data 144 as a function of shipment elements. In one or more embodiments, carbon emission data 144 may include total carbon emissions of a shipment. In other embodiments, carbon emission data 144 may include itemized carbon emission data related to one or more shipment elements of the shipment.

Still referring to FIG. 2, as shown in step 220, method 200 may include generating, by processor 160, a proposed shipment schedule 152 as a function of shipment elements 116 and/or carbon emission data 144. For the purposes of this disclosure, a "proposed shipment schedule" is an offered schedule providing shipment elements related to the transportation of goods for a customer. In one or more embodiments, a proposed shipment schedule 152 may be generated based on a selection of shipment elements 116 that in combination with each other include a minimum carbon emission data quantity. For example, and without limitation, proposed shipment 152 may include the use of a first vehicle over other available vehicles for the shipment since first vehicle has, for example, a desirable fuel efficiency, a desirable amount of greenhouse gas emissions, desirable payload or cargo space, and the like. In another example, and without limitation, proposed shipment schedule 152 may include a first route instead of other routes to the destination of the shipment based on the first route including, for example, a desirable distance (e.g., a shorter distance than other routes), desirable topography (e.g., less inclines or high-gradient roads), favorable traffic conditions (e.g., minimum traffic), desirable weather conditions (e.g., no black ice), and the like.

Still referring to FIG. 2, as shown in step 225, method 200 includes obtaining an electronic acknowledgement from the customer. The proposed shipment schedule may become an approved shipment schedule if the customer answers "yes." Upon approval, the shipment schedule may performed by the vendor.

Still referring to FIG. 2, as shown in step 230, method 200 may include, if the customer does not approve the proposed shipment schedule, providing, by processor 160, one or more alternative shipment elements to the customer. For the purposes of this disclosure, an "alternative shipment element", or "updated shipment element", is a shipment element of a proposed shipment schedule that is different more a shipment element of a previously proposed shipment schedule. In one or more embodiments, various shipment elements 116 and determined carbon emission 144 data may be presented to the customer. In other embodiments, updated shipment elements and updated carbon emission data may be provided and determined, respectively. In one or more embodiments, alternative shipment elements may be provided to a user. For example, and without limitation, a list of shipment elements may be presented to a customer on a remote device. In one or more embodiments, customer may select one or more alternative shipment elements. Computing device 104 may determine alternative carbon emission data as a function of the selected alternative shipment elements. In some embodiments, alternative carbon emission data may be determined using the alternative shipment elements in a similar manner as described above with respect to FIG. 1 for determining carbon emission data 144 using shipment elements 116. As a non-limiting example, alternative carbon emission data may be calculated using carbon emission machine-learning module 132. An updated shipment schedule may then be presented as a function of the alternative carbon emission data. For the purposes of this disclosure, an "updated shipment schedule" include a proposed schedule that is different from a previously proposed shipment schedule, where the updated shipment schedule is a function of alternative carbon emissions related to alternative shipment elements. Updated shipment schedule may include carbon emission data that is considered more desirable to a customer. Updated shipment schedule may include an alternative shipment option for transportation of goods that a user may elect using an electronic acknowledgement. An "electronic acknowledgment" is, for the purposes of this disclosure, a digital confirmation from a customer. An electronic acknowledgement may include a signature or mark to securely indicate a selection from a list of proposed shipment schedules. Computing device 104 may then compare carbon emission data of shipment elements with alternative carbon emission data of alternative shipment elements so that a customer may see the change in carbon emissions of the prior proposed shipment schedule and the updated shipment schedule. In one or more embodiments, comparisons between shipment elements, corresponding carbon emission data, and respective shipment schedules may be displayed side-by-side for a customer to see. For example, and without limitation, one or more graphs may be displayed on a display of computing device that relate to one or more shipment schedules or aspect thereof.

Still referring to FIG. 2, as shown in step 235, method 200 may include receiving, by processor 160, one or more elected alternative shipment elements of a customer input. For the purposes of this disclosure, "customer input" is an action by a customer that generates an electronic signal related to a desire of a customer. In one or more embodiments, customer input may be generated using a graphical user interface (GUI). In one or more embodiments, customer input may be transmitted from remote user device to computing device 104 via, for example, communication component 164. In one or more embodiments, communication component may include wired or wireless communication. Communication component 164 may include a network interface device, such as network interface device described with respect to FIGS. 1 and 5. Communication component 164 may include a transceiver, receiver, transmitter, and the like. Communication component may receive and or transmit analog or digital signals. Communication component 164 may be integrated into computing device or a separate component.

Still referring to FIG. 2, as shown in step 240, method 200 may include updating, by processor 160, proposed shipment schedule as a function of the customer input. In one or more embodiments, a customer input includes a selection of one or more alternative shipment elements and, thus, corresponding carbon emission data.

Figure 3:
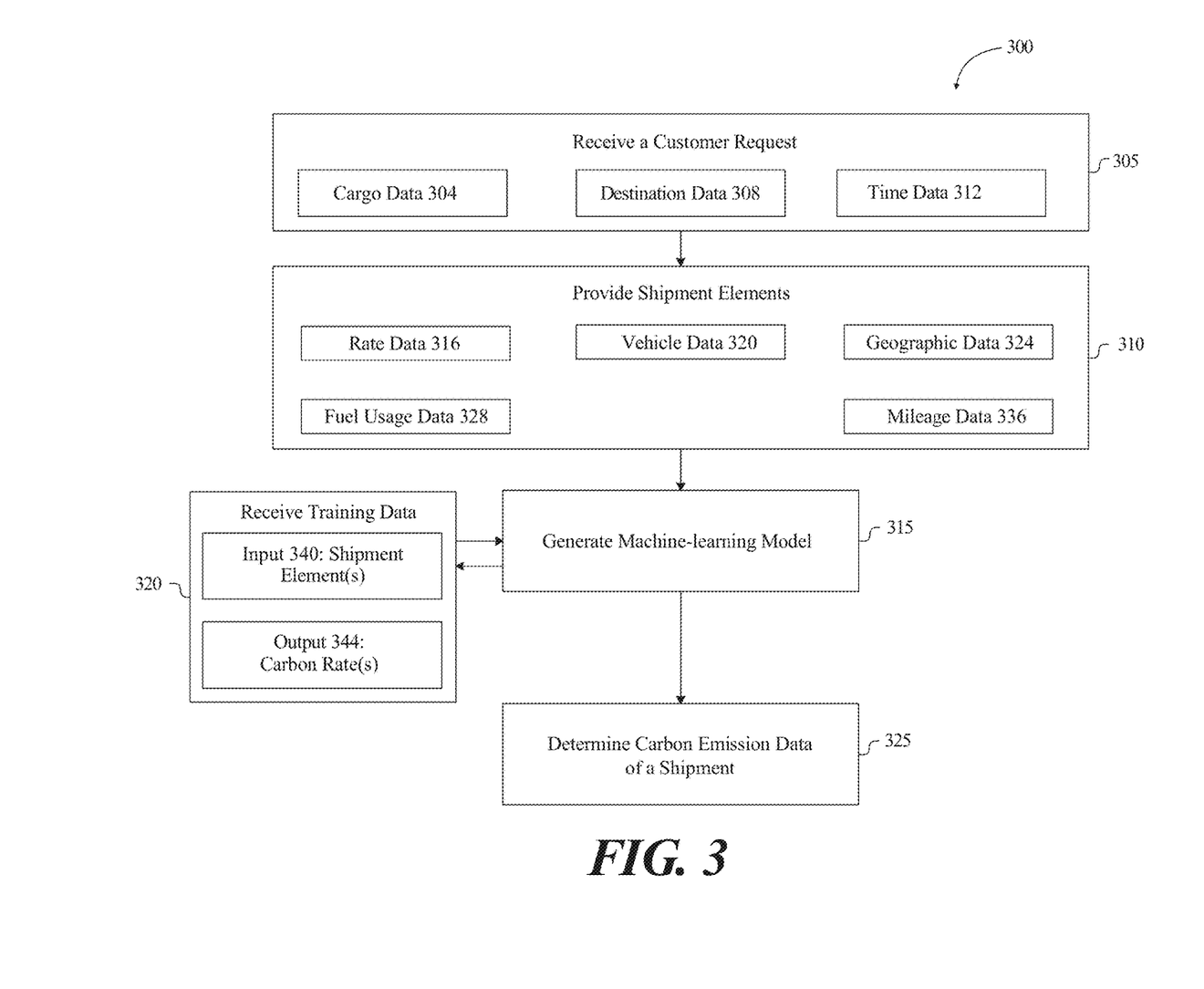
FIG. 3 is a flow chart of an exemplary method for generating and using a machine-learning module in accordance with one or more embodiments of the present disclosure.

Now referring to FIG. 3, a flow chart of an exemplary embodiment of a method 300 for determining carbon emission data 144 of a shipment using a carbon rate machine-learning module 132 is shown. As shown in block 305, method 300 may include receiving customer request 112. In one or more embodiments, customer request 112 may include various data and/or information related to a shipment needed by a customer. For example, and without limitation, customer request may include cargo data 304. For the purposes of this disclosure, "cargo data" is information related to one or more characteristics of a moveable good, such as and without limitation, a product of a customer. For instance, and without limitation, cargo data may include information related to a quantity of a good, which may be measured in weight (e.g., 200 lbs), a spatial measurement (e.g., 6 ft$^3$), or a numerical value (e.g., 150 count of a particular product). In another instance, and without limitation, cargo data 304 may include characteristic information, such as fragility, shape, surface area, packaging, expiration date, perishable status, temperature requirement, and the like.

Still referring to FIG. 3, in one or more embodiments, customer request 112 may include destination data 308. For the purposes of this disclosure, "destination data" is data relating to a location to which the good of the shipment is to be delivered. In some embodiments, destination data may include data regarding the location where the shipment schedule terminates at.

Still referring to FIG. 3, in one or more embodiments, customer request 112 may include temporal data 312. In one or more embodiments, temporal data 312 may include a desired time of arrival, time of departure, or a time of a particular checkpoint of shipment schedule.

Still referring to FIG. 3, as shown in step 310, method 300 includes providing shipment elements 116. Shipment elements 116 may include at least one or more of the following: rate of travel 316, vehicle data 320, geographical data 324, fuel usage data 328, mileage data 336, and the like, as discussed further in this disclosure.

With continued reference to FIG. 3, as shown in step 315, computing device 315 may generate a carbon emission machine-learning model. Computing device 104 may use a carbon emission machine-learning model to calculate carbon emission data 144. Carbon emission machine-learning model may be created using a machine-learning module 132. Machine-learning module 132 may be consistent with any machine-learning module disclosed as part of this disclosure; particularly, machine-learning module may be consistent with machine-learning module 400 disclosed with reference to FIG. 4.

With continued reference to FIG. 3, in some embodiments, carbon emission datum 144 may be calculated using a lookup table. A "lookup table," for the purposes of this disclosure, is an array of data that maps input values to output values. A lookup table may be used to replace a runtime computation with an array indexing operation. As a non-limiting example, a carbon emission lookup table may relate fuel consumption data to carbon emission datum 144. As a non-limiting example, computing device 104 may be configured to "lookup" a given fuel consumption datum in order to find a corresponding carbon emission datum 144. As a non-limiting example, computing device 104 may be configured to "lookup" a given mileage datum in order to find a correlating carbon emission datum 144.

With continued reference to FIG. 3, in some embodiments, carbon emission machine-learning model may be trained using carbon emission training data 136. Carbon emission training data 136 may include a plurality of exemplary shipment element inputs 340, such as fuel consumption data and/or mileage data, with associated carbon emission outputs 344 of carbon emission data. In some embodiments, carbon emission training data 136 may also include fuel type, traffic data, or other types of data as inputs that are correlated to carbon emissions.

With continued reference to FIG. 3, in some embodiments, shipment elements 116 may be associated with one or more tasks of the shipment. For the purposes of this disclosure, a "task datum" is an element of data associated with a task. In some embodiments, task datum may be associated with the at least a carbon emission data. Task datum may be an element of task data. Task data may include, as non-limiting examples, vehicle data, distance data, terrain data, time data, cargo data, speed data, fuel data, traffic data, route data, and the like. In some embodiments, the task datum may comprise a vehicle datum. For the purposes of this disclosure, a "vehicle datum" is an element of data concerning the type of transport vehicle. In some embodiments, vehicle datum may pertain to the transport vehicle that was used to accomplish the relevant task. Vehicle datum may include a type of vehicle, such as, as non-limiting examples, a truck, a car, a tractor, a motorcycle, a bike, and the like. In some embodiments, vehicle datum may include a make of vehicle, such as VOLVO, MACK, PETERBILT, FORD, BMW, YAMAHA, and the like. In some embodiments, vehicle datum may include a model of vehicle, such as LR, TERRAPRO, F150, PRIUS, IMPALA, and the like. In some embodiments, vehicle datum may include a mile per gallon rating for a vehicle such as, 24 mpg, 30 mpg, 17, mpg, and the like. In some embodiments, the task datum may comprise a distance datum. For the purposes of this disclosure, a "distance datum" is an element of data concerning the amount of distance traversed during a task. As non-limiting examples, distance datum may be 50 miles, 10 miles, 5 miles, and the like. Distance datum may be expressed in any suitable distance unit, including but not limited to miles, kilometers, feet, yards, furlongs, leagues, and the like.

With continued reference to FIG. 3, as shown in step 325, method 300 may include determining carbon emission data of a shipment. In one or more embodiments, carbon emission data 144 may include a plurality of carbon emission data 144 related to one or more shipments elements of the shipment. As a nonlimiting example, a first carbon emission datum may be associated with a first shipment element, a second carbon emission datum may be associated with a second shipment element, and so on.

Still referring to FIG. 3, shipment element 116 may be determined as a function of rate data 316. In one or more embodiments, rate data 316 may include a rate of travel (e.g., mpg, kph, and the like). In other various embodiments, and as a non-limiting example, rate data 316 may include a fuel emission rate. Fuel emission rate may be used to calculate carbon emission datum 144 from a fuel consumption datum. In some embodiments, fuel emission rate may represent an amount of carbon emission per volume of fuel used. Fuel emission rate may be stored in a database and retrieved by computing device 104. As a non-limiting example, a mileage emission rate may be used to calculate carbon emission data 144 from a mileage datum. In some embodiments, mileage rate may represent an amount of carbon emission per distance traveled. Mileage rate may be stored in a database, such as a shipment element database, and retrieved by computing device 104.

Still referring to FIG. 3, carbon emission data 144 may be calculated as a function of vehicle data 320. In one or more embodiments, vehicle data 320 may include a weight of the vehicle and/or components thereof (e.g., an attached trailer), a capacity of the vehicle, a make and model of the vehicle, an engine or motor characteristics of the vehicle (e.g., torque, horsepower, size, and the like), and the like.

Still referring to FIG. 3, carbon emission data 144 may be determined as a function of geographic data 324. In one or more embodiments of the present disclosure, geographic data may include data that can be mapped to a sphere (e.g., a spherical representation of Earth). Geographic data may be indicated using longitude and latitude related to the location of an object on Earth. In various embodiments, geographic data may include GPS data. In one or more embodiments, geographic data may include geometric data, where geometric data may be mapped on a two-dimensional (2D) surface. In one or more embodiments, geographic data 324 may include topography of a surface, such as the surface of the Earth. For example, and without limitation, geographic data may include a gradient of a hill, an altitude of a location, a change in altitude of a road, a curvature of a road, and the like. In one or more embodiments, geographic data 324 may include an environmental condition. For example, and without limitation, environmental conditions may include ambient temperature, weather (e.g., snow, rain, sleet, sunshine, humidity, and the like), road conditions (e.g., black ice on a road, paving of a road, and the like), and the like.

Still referring to FIG. 3, in some embodiments, carbon emission data 144 may be calculated as a function of fuel usage data 328. For the purposes of this disclosure, "fuel usage data", or "fuel consumption data", is data pertaining to amounts of fuel consumed over a period of time by a vehicle such as, for example, a transportation vehicle. In one or more embodiments, fuel usage data may include the type of fuel used an/or consumed during the period of time. Fuel may include, but is not limited to, gasoline, diesel, propane, electricity, liquefied natural gas, and/or other fuel types. In some embodiments, a transport vehicle may use alternative fuel. An "alternative fuel" as used in this disclosure is any energy source generated without a use of fossils. A "fossil" as used in this disclosure is preserved remains of any once-living organism. Alternative fuels may include, but are not limited to, nuclear power, compressed air, hydrogen power, bio-fuel, vegetable oil, propane, and the like. In the instance of alternative fuel, an energy conversion factor may be included. In some embodiments, an energy conversion factor may include, but is not limited to, gallons to electric equivalent for a hybrid or electric transport vehicle. Greenhouse gas data may be consistent with any greenhouse gas data disclosed in U.S. patent application Ser. No. 17/749,535, filed on May 20, 2022, and entitled "SYSTEM AND METHOD FOR GREENHOUSE GAS TRACKING," the entirety of which is incorporated by reference herein in its entirety. The period of time may be, as a nonlimiting example, the duration of a shipment and/or a at least a portion of the shipment (e.g., over a specific distance of a shipment distance). As another nonlimiting example, the period of time may be the period of time it took to complete a particular task (e.g., reach a specific checkpoint or complete an entire shipment). As a non-limiting example, if a task took 5 hours to complete, the period of time may correspond to those 5 hours. A "task," for the purposes of this disclosure is an item of work of a shipment element. In some embodiments, the task may be a task that is to be done or has been done by an operator. In some embodiments, the task may be a job for an operator, which includes moving one or more objects from one location to another. In some embodiments, the task may be a job for an operator, which includes moving one or more objects from one location to another using a transport vehicle. In some embodiments, the task may be a job for an operator to do using a transport vehicle.

Still referring to FIG. 3, in some embodiments, carbon emission datum 144 may be calculated from mileage data 336. For the purposes of this disclosure, "mileage data" is data pertaining to a number of miles traversed by a transport vehicle. Mileage data 336 may be measured in miles, kilometers, feet, yards, furlongs, leagues, and/or any other suitable distance unit. Mileage data 336 may be measured over a period of time. The period of time may be, as a non-limiting example, the career of an operator. As another non-limiting example, the period of time may be the last 3 days, 1 week, 3 months, 2 years, and the like. As another non-limiting example, the period of time may be the period of time it took to complete a particular task. As a non-limiting example, if a task took 5 hours to complete, the period of time may correspond to those 5 hours. In some embodiments, other types of data may be used to calculate carbon emission datum 144 such as type of fuel, idling time, traffic data, and the like. A person of ordinary skill in the art would appreciate, after having reviewed the entirety of this disclosure, that a variety of data could be used in addition to or in place of the data mentioned here in order to calculate the carbon emission datum 144.

With continued reference to FIG. 3, memory 156 contains instructions configuring processor 160 to calculate a carbon emission data 144. In one or more embodiments, carbon emission data may include carbon emission rates. For the purposes of this disclosure, a "carbon emission rate" is a measurement of carbon emissions measured against another quantity. In some embodiments, calculating carbon emission rate may be as a function of a shipment element data. As a non-limiting example, carbon emission rate may be calculated as a function of distance data. In some embodiments, carbon emission rate may be a measurement of carbon emissions over a distance (e.g., traveled distance by a transportation vehicle carrying goods). In some embodiments, carbon emission rate may be expressed in units of weight (or mass) over distance. As non-limiting examples, carbon emission rate may be expressed in lbs/mi, kg/m, tons/km, and the like. In some embodiments, carbon emission rate may be calculated as a function of time data. In some embodiments, carbon emission rate may be a measurement of carbon emissions over time. In some embodiments, carbon emission rate may be expressed in units of weight (or mass) over time. As non-limiting examples, carbon emission rate may be expressed in lbs/min, kg/hr, tons/hr, and the like. In some embodiments, carbon emission rate may be calculated as a function of cargo data. In some embodiments, carbon emission rate may be a measurement of carbon emissions over cargo weight. In some embodiments, this may be a ratio. In some embodiments, carbon emission rate may be expressed in units of weight (or mass) over cargo weight (or mass). As non-limiting examples, carbon emission rate may be expressed in tons/lb, lbs/lbs, kg/kg, kg/g, and the like. In some embodiments, calculating carbon emission rate may include calculating a carbon emission rate for each of a plurality of tasks that an operator has conducted. In some embodiments, calculating carbon emission rate may include calculating a carbon emission rate for each operator of a plurality of operators. In some embodiments, calculating carbon emission rate may include calculating a carbon emission rate for each vehicle of a plurality of vehicles. This may be done, for example and without limitation, when task data includes a vehicle data. As a non-limiting example, this may include calculating a carbon emission rate for each vehicle that an operator uses.

With continued reference to FIG. 3, memory 156 contains instructions configuring processor 160 to calculate a carbon efficiency score of a shipment element as a function of the carbon emission rate. For the purposes of this disclosure, a "carbon efficiency score" is a score that represents a shipment element's carbon efficiency. As a nonlimiting example, carbon efficiency score may represent a carbon efficiency of a transport schedule used to for shipment schedule, such as the type of transport vehicle indicated by vehicle data. As a non-limiting example, carbon efficiency score may represent a carbon efficiency when transporting a particular type of cargo. In some embodiments, the type of cargo may be a category of cargo as disclosed above. In some embodiments, the type of cargo may be a weight (or mass) of the cargo, such as under 500 lbs, 500 lbs to a ton, 1 ton-3 tons, over 3 tons, and the like. In some embodiments, this information may be attained from cargo data. In some embodiments, carbon efficiency score may represent a carbon efficiency of the traversing of a certain terrain, such as a terrain indicated by geographical data. As a non-limiting example, the terrain may be a surface type, such as paved, dirt, gravel, ice, and the like. As a nonlimiting example, the terrain may be a total elevation change. As non-limiting examples, the total elevation change may be under 500 ft, 500 ft-1500 ft, over 1500 ft, −500 ft to 500 ft, and the like.

With continued reference to FIG. 3, in some embodiments, memory 156 may contain instructions configuring processor 160 to train a carbon efficiency machine-learning model. In some embodiments, processor 160 may use machine-learning module to train carbon efficiency machine-learning model. Training carbon efficiency machine-learning model may include training carbon efficiency machine-learning model using carbon efficiency training data. Carbon efficiency training data may include a plurality of inputs correlated to a plurality of outputs.

With continued reference to FIG. 3, the "inputs" for carbon efficiency training data may include carbon emission data and shipment elements. In some embodiments, carbon efficiency training data may include examples of carbon emission data. In some embodiments, carbon efficiency training data may include examples of carbon emission data and associated examples of shipment elements. In some embodiments, carbon efficiency training data may include examples of carbon emission rate. In some embodiments, carbon efficiency training data may include examples of carbon emission rate and associated examples of carbon emission data and shipment element.

With continued reference to FIG. 3, the "outputs" for carbon efficiency training data may include examples of carbon efficiency scores which are correlated to inputs of carbon efficiency training data. As a non-limiting example, carbon efficiency training data may include a carbon emission rate associated with a carbon efficiency score. As another non-limiting example, carbon efficiency training data may include carbon emission data and the one or more shipment elements associated with a carbon efficiency score. As another nonlimiting example, carbon efficiency training data may include carbon emission rate and shipment elements associated with a carbon efficiency score.

With continued reference to FIG. 3, in some embodiments, shipment elements may be classified into task categories. Task categories may include, as non-limiting examples, heavy-load tasks, mountainous tasks, wide load tasks, and the like. In some embodiments, task categories may correspond to types of tasks with differing expected carbon emissions. As a nonlimiting example, tasks that are "mountainous" or contain long periods of altitude change may be expected to have higher carbon emissions. On the other hand, tasks with little to no elevation change may be expected to have lower expected carbon emissions. As another non-limiting example, tasks with low variance in transport vehicle speed may have lower expected carbon emissions. On the other hand, tasks with high variance in transport vehicle speed (which may arise in high-traffic areas) may have higher expected carbon emissions.

With continued reference to FIG. 3, in some embodiments, shipment elements may be classified into task categories using a task classifier. A "task classifier," for the purposes of this disclosure, is a classifier configured to sort shipment elements into task categories. Classifiers are discussed further with reference to FIG. 4. Task classifier may receive data concerning a shipment element, such as shipment element data as an input, and may output a task category for the shipment element. Task classifier may be trained by machine-learning module. In some embodiments, task classifier may be trained using training data containing sets of shipment element data with associated task categories. In some embodiments, task classifier may be trained using training data containing sets of shipment elements correlated to associated carbon emission data or carbon emission rates. In these embodiments, task classifier may be trained to group tasks with similar carbon emission data or carbon emission rates into like task categories. In some embodiments, task categories may be used to calculate carbon efficiency score. As a non-limiting example, if a shipment element is associated with higher carbon emissions, the carbon efficiency score may be increased or augmented to account for this fact. As a non-limiting example, if a shipment element is associated with lower carbon emissions, the carbon efficiency score may be decreased or discounted to account for this fact. In some embodiments, the shipment element data used to train carbon efficiency machine-learning model may include associated task categories. In some embodiments, carbon efficiency machine-learning model may receive as input shipment elements including associated task categories.

With continued reference to FIG. 3, in some embodiments, memory 156 may contain instructions configuring processor 160 to calculate a greenhouse gas ratio. The calculation of a greenhouse gas ratio is discussed further in this disclosure.

With continued reference to FIG. 3, memory 156 may contain instructions configuring processor 160 to generate shipment element ranking. For the purposes of this disclosure, a "shipment element ranking" is an ordered list of shipment elements based on carbon emissions and/or carbon emission rates. Shipment element ranking is a function of the carbon efficiency score of a shipment element. As a non-limiting example, shipment element ranking may include an ordered list of shipment elements, wherein the list is ordered based on the carbon efficiency score of the shipment elements. In some embodiments, shipment element ranking may be ordered in a decreasing order, such that the shipment element with the largest carbon efficiency score is listed first and the shipment element with the smallest carbon efficiency score is listed last. In some embodiments, shipment element ranking may be ordered in an ascending order, such that the shipment element with the smallest carbon efficiency score is listed first and the shipment element with the largest carbon efficiency score is listed last.

With continued reference to FIG. 3, computing device 104 may display shipment element ranking on a display device. A "display device," for the purposes of this disclosure, is a device that is capable of displaying data in a visual manner. Display device may include, as non-limiting examples, a television, a computer monitor, an LCD screen, an OLED screen, a CRT screen, and the like. Display device may be communicatively connected to computing device 104. In some embodiments, display device may be local (located on the same network) to computing device 104. In some embodiments, display device may be remote (located on a different network) to computing device 104. In some embodiments, shipment element ranking may include shipment elements associated with each corresponding carbon emission data and or carbon emission rate data in shipment element ranking. As non-limiting example, shipment element ranking may be included in an alternative shipment element list that may be presented to a customer. In a nonlimiting embodiment, if a customer does not approve of a first proposed shipment schedule, then the customer may select alternative shipment elements from the list, which may be scored and/or ranked, to generate an updated proposed shipment schedule.

With continued reference to FIG. 3, computing device 104 may transmit shipment element ranking, alternative shipment element list, proposed shipment schedule, updated proposed shipment schedule, approved shipment schedule, and the like to a remote device. For the purposes of this disclosure, a "remote device" is a computing device that is located remotely to computing device 104. As non-limiting examples, remote device may include a laptop, smartphone, tablet, desktop, and the like. In some embodiments, once remote device has received shipment element ranking, remote device may display operator ranking using a remote display device. Remote display device may be consistent with display device as disclosed in this disclosure. In some embodiments, computing device 104 may command remote device to display shipment element ranking.

Figure 4:
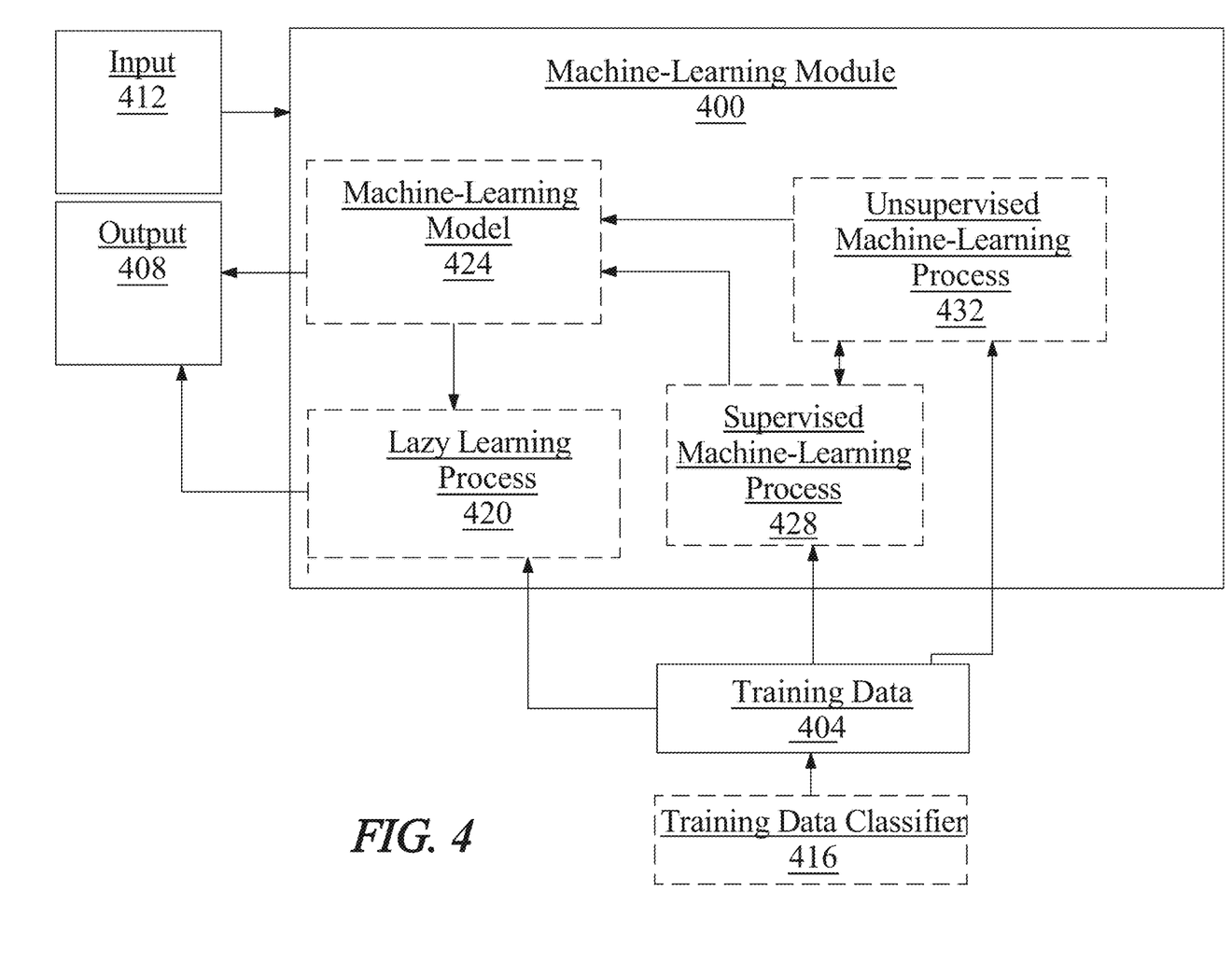
FIG. 4 is a block diagram of a machine-learning system in accordance with one or more embodiments of the present disclosure.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
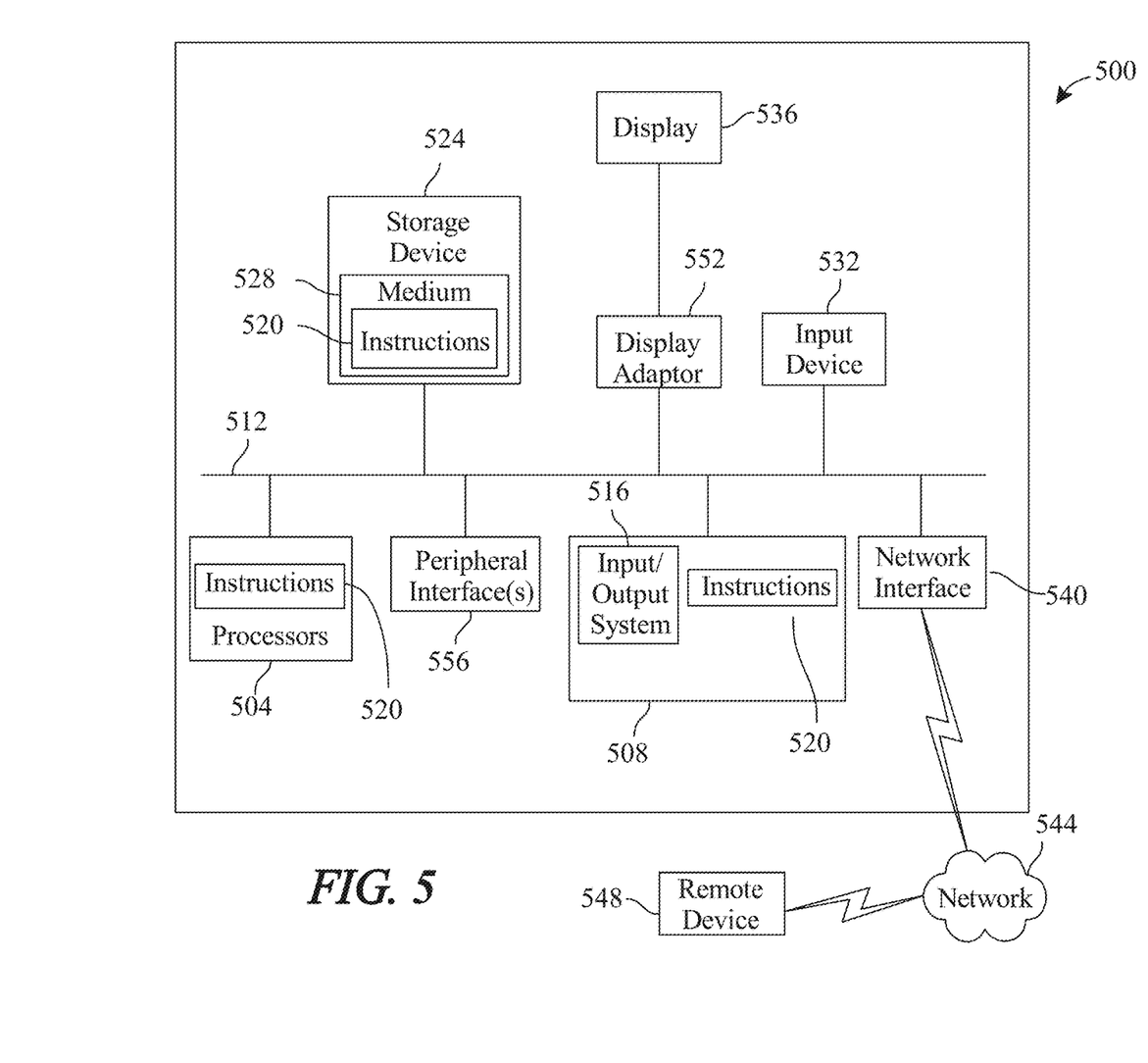
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

What is claimed is:

1. An apparatus for determining carbon emissions of a shipment, the apparatus comprising:
    at least a processor; and
    a memory communicatively connected to the at least a processor, the memory comprising instructions configuring the at least a processor to:
        receive a customer request from a customer for a shipment, wherein the customer request comprises at least cargo data associated with the shipment and at least destination data associated with a transport of the shipment;
        provide one or more shipment elements for the shipment as a function of the customer request, wherein the one or more shipment elements comprise identification of at least a transport vehicle configured to transport the shipment, and wherein providing the one or more shipment elements comprises:
            receiving historical data associated with previous shipments from one or more sensors communicatively connected to one or more transport vehicles; and
            generating the one or more shipment elements as a function of the historical data;
        classify the one or more shipment elements to one or more task categories using a task classifier, wherein the task classifier comprises a machine learning model, and wherein classifying the one or more shipment elements to the one or more task categories comprises:
            receiving training data comprising sets of shipment elements associated with task categories;
            training the machine learning model to group shipment elements with similar carbon emission data to similar task categories using the training data; and
            classifying the one or more shipment elements to the one or more task categories as a function of the machine learning model;
        determine carbon emission data as a function of the one or more shipment elements and the classification of the one or more shipment elements to the one or more task categories; and
        generate a proposed shipment schedule of a plurality of shipment schedules as a function of the carbon emission data, wherein generating the proposed shipment schedule of the plurality of shipment schedules further comprises:
            determining a minimum carbon emission data quantity as a function of the carbon emission data for each shipment schedule of the plurality of shipment schedules;
            generating the minimum carbon emission data quantity for each shipment schedule of the plurality of shipment schedules; and
            selecting the shipment schedule of the plurality of shipment schedules with the least carbon emission data quantity.

2. The apparatus of claim 1, wherein the memory contains instructions further configuring the at least a processor to receive an electronic acknowledgement from the customer approving the proposed shipment schedule.

3. The apparatus of claim 1, wherein the memory contains instructions further configuring the at least a processor to receive a customer input from the customer.

4. The apparatus of claim 3, wherein the customer input comprises a selection of an alternative shipment element of a plurality of alternative shipment elements.

5. The apparatus of claim 4, wherein the memory contains instructions further configuring the at least a processor to:
    determine alternative carbon emission data as a function of the selected alternative shipment element of the plurality of alternative shipment elements; and
    calculate a change in the carbon emission data of the proposed shipment schedule and the alternative carbon emission data of the selected alternative shipment element.

6. The apparatus of claim 4, wherein the memory contains instructions further configuring the at least a processor to generate an updated shipment schedule as a function of the alternative carbon emission data.

7. The apparatus of claim 1, wherein the one or more shipment elements comprise vehicle data.

8. The apparatus of claim 1, wherein the one or more shipment elements comprise fuel usage data.

9. The apparatus of claim 1, wherein the memory contains instructions further configuring the at least a processor to:
    receive a training data set, wherein the training data set comprises outputs correlated with inputs, wherein the inputs comprise a plurality of shipment element inputs and the outputs comprise a plurality of carbon emission data outputs; and
    generate a carbon emission machine-learning model as a function of the training data set, wherein the carbon emission machine-learning model determines the carbon emission as a function of the one or more shipment elements.

10. A method of determining carbon emission of a shipment, the method comprising:
    receiving, by a processor, a customer request from a customer for a shipment, wherein the customer request comprises at least cargo data associated with the shipment and at least destination data associated with a transport of the shipment;
    providing, by the processor, one or more shipment elements for the shipment as a function of the customer request wherein the one or more shipment elements comprise identification of at least a transport vehicle configured to transport the shipment, and wherein providing the one or more shipment elements comprises:

receiving historical data associated with previous shipments from one or more sensors communicatively connected to one or more transport vehicles; and generating the one or more shipment elements as a function of the historical data;

classifying, by the processor, the one or more shipment elements to one or more task categories using a task classifier wherein the task classifier comprises a machine learning model and wherein classifying the one or more shipment elements to the one or more task categories comprises:

receiving training data comprising sets of shipment elements associated with task categories; and training the machine learning model to group shipment elements with similar carbon emission data to similar task categories using the training data; and classifying the one or more shipment elements to the one or more task categories as a function of the machine learning model;

determining, by the processor, carbon emission data as a function of the one or more shipment elements and the classification of the one or more shipment elements to the one or more task categories; and generating, by the processor, a proposed shipment schedule of a plurality of shipment schedules as a function of carbon emission data of a plurality of shipment schedules as a function of the carbon emission data, wherein generating the proposed shipment schedule of the plurality of shipment schedules further comprises:

determining a minimum carbon emission data quantity as a function of the carbon emission data for each shipment schedule of the plurality of shipment schedules;

generating the minimum carbon emission data quantity for each shipment schedule of the plurality of shipment schedules; and selecting the shipment schedule of the plurality of shipment schedules with the least carbon emission data quantity.

11. The method of claim 10, further comprising, obtaining, by the processor, an electronic acknowledgement from the customer approving the proposed shipment schedule.

12. The method of claim 10, further comprising receiving, by the processor, a customer input from the customer.

13. The method of claim 12, wherein the customer input comprises a selection of alternative shipment elements and corresponding carbon emission.

14. The method of claim 13, further comprising:

determining, by the processor, alternative carbon emission data as a function of the selected alternative shipment element of the plurality of alternative shipment elements; and calculating, by the processor, a change in the carbon emission data of the proposed shipment schedule and the alternative carbon emission data of the selected alternative shipment element.

15. The method of claim 13, further comprising generating, by the processor, an updated shipment schedule as a function of the alternative shipment elements.

16. The method of claim 10, wherein the one or more shipment elements comprise vehicle data.

17. The method of claim 10, wherein the one or more shipment elements comprise fuel usage data.

18. The method of claim 10, further comprising:

receiving, by the processor, a training data set, wherein the training data set comprises outputs correlated with inputs, wherein the inputs comprise a plurality of shipment elements and the outputs comprise a plurality of carbon emission data; and generating, by the processor, a carbon emission machine-learning model as a function of the training data set, wherein the carbon emission machine-learning model determines the carbon emission as a function of the one or more shipment elements.

* * * * *